United States Patent [19]

Farmer et al.

[11] Patent Number: 4,922,532
[45] Date of Patent: May 1, 1990

[54] SYNC SUPPRESSION SCRAMBLING AND DESCRAMBLING OF TELEVISION SIGNALS FOR SUBSCRIPTION TV

[75] Inventors: James O. Farmer, Lilburn; Luis A. Rovira, Norcross, both of Ga.

[73] Assignee: Scientific-Atlanta, Inc., Atlanta, Ga.

[21] Appl. No.: 226,006

[22] Filed: Jul. 29, 1988

[51] Int. Cl.⁵ .............................................. H04N 7/167
[52] U.S. Cl. ........................................ 380/15; 380/19
[58] Field of Search ..................................... 380/15, 19

[56] References Cited

U.S. PATENT DOCUMENTS

| | | |
|---|---|---|
| 3,530,232 | 9/1970 | Reiter et al. ............................ 380/15 |
| 4,466,017 | 8/1984 | Banker . |
| 4,471,380 | 9/1984 | Mobley . |
| 4,639,777 | 1/1987 | Mori . |

Primary Examiner—Stephen C. Buczinski
Attorney, Agent, or Firm—Martin LuKacher

[57] ABSTRACT

The quality of sound delivered to a subscriber viewing a channel which has been scrambled using sync suppression scrambling, particularly when the program is being transmitted with stereo sound, is improved by processing the aural component of the TV signal at the head end of the system prior to transmission over the cable or other communication link to the subscribers. The amplitude of the aural signal is reduced so as to compensate for the increase in amplitude which occurs when the composite TV signal is descrambled by restoring the amplitude of the suppressed synchronizing signals thereof. No changes are required in the existing subscriber equipment and the subscribers may continue to use the descramblers supplied to them without any modification thereof. Noises, such as are perceived as a "buzz" like sound, and loss of stereo separation of the aural signal upon descrambling are avoided.

13 Claims, 3 Drawing Sheets

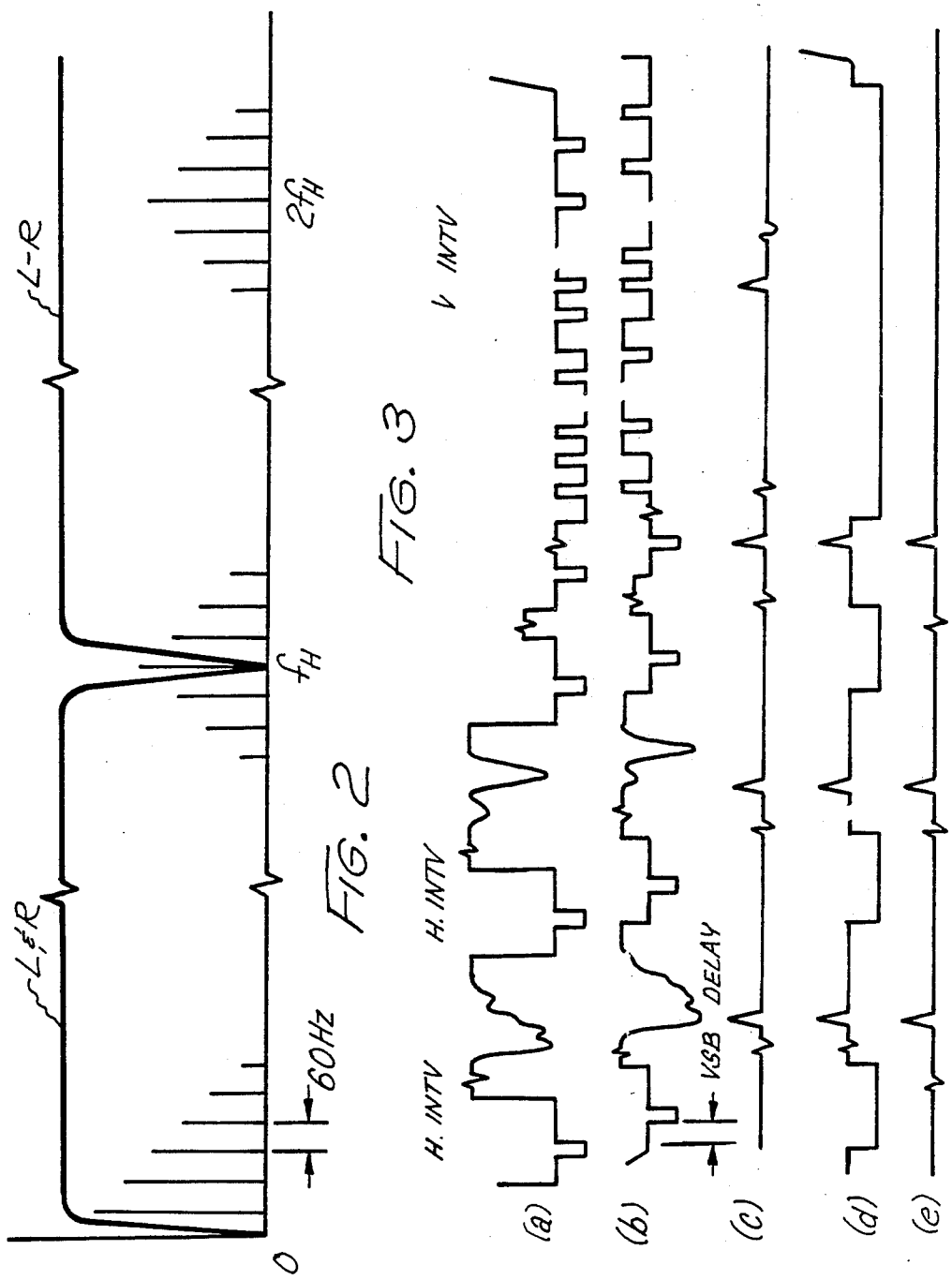

SYNC SUPPRESSION SCRAMBLING AND DESCRAMBLING OF TELEVISION SIGNALS FOR SUBSCRIPTION TV

The present invention relates to subscription television using sync suppression scrambling and descrambling which distorts TV signals when displayed except at authorized receivers which are equipped with descramblers.

The invention is especially suitable for use in the transmission of subscription TV programs by cable systems. The invention may also be applied wherever sync suppression scrambling or descrambling is used, whether the transmission link is a cable or a broadcast or satellite link.

Sync suppression scrambling and descrambling is a well known and accepted technique for encoding and decoding subscription television signals wherein the amplitude of the vertical or horizontal synchronizing (sync) signals, or both, is attenuated or reduced in amplitude so as to prevent the display from being locked in. The picture received by a subscriber not equipped with a descrambler, rolls and is so distorted as to make viewing impossible or uncomfortable. Reference may be had to U.S. Pat. No. 4,466,017 issued to Robert O. Banker on Aug. 14, 1984 for further information as to sync suppression scrambling and descrambling of television signals.

When the television subscriber uses a television set having audio circuits with extended frequency response or with television stereo sound capability, the sync suppression scrambling and descrambling circuits can produce an unacceptable amount of noise, particularly in the form of a buzz like noise. Some stereo sound equipped receivers can also lose stereo separation on channels which are scrambled and then descrambled. The problem arises out of the amplitude modulation or distortion of the sound or aural component of the television signal by the descrambler. The entire composite television signal in which the video and audio components are combined, is passed through the descrambler where the composite signal amplitude is increased during the synchronizing signal intervals so as to restore the synchronizing information. The amplitude of the aural component of the signal is also increased and at the same rate as the synchronizing signals. The energy added during the vertical interval for restoration is significant and occurs at a 60 Hz rate so as to impose the buzz like noise upon separation of the aural and video components of the composite signal in the intercarrier detector circuits of the television receiver and demodulation of the aural component signals.

The problem exists even though television sound is carried as frequency modulation (FM) of the aural or sound carrier that is transmitted with the video in the composite TV signal. Practical FM detectors and discriminators are sensitive primarily to the FM on the aural carrier. However they do not completely reject amplitude modulation (AM). Thus, when a television receiver or stereo decoder encounters AM pulses due to the descrambling, the pulses can be converted into sound signals in the form of noise which can result in the annoying interference referred to above as buzz. Also, the AM component of the aural carrier wave results in a phase displacement of the signal which is detected during FM demodulation resulting in the interfering noise. One mechanism by which this noise is generated is that any band pass filter, through which the audio carrier passes and which is not symmetrical about the audio carrier, will modify the structure of the side bands on each side of the carrier. This produces a phase (or frequency) modulation component. Another mechanism which produces AM to FM conversion is that the limiter in the FM demodulator does not limit symmetrically about the zero crossing point of the audio carrier wave.

The existence of this buzz problem has theretofore been recognized (see U.S. Pat. No. 4,639,777 issued Jan. 27, 1987.) However the solution proposed requires separation of the aural carrier from the composite TV signal prior to descrambling. This solution is unacceptable since it would require a redesign of all of the descramblers which are in the field. Such descramblers are designed to process the composite TV signal and do not have provisions for shunting the sound signals around the descrambler. Such provisions, as well as the additional circuitry for handling timing signals and for recombining the descrambled video with the aural components back into the TV signal at RF so that it can be inputted to the television receiver of the subscriber, are difficult and expensive to design and build. In other words, the heretofore proposed solution would require scrapping of hundreds of thousands of descramblers which are in use in the field.

It is the principal object of the present invention to provide an improved system (method and apparatus) for sync suppression scrambling and descrambling in which adverse effects on the reproduction of sound (especially the introduction of annoying buzz like interference) is avoided without the need to obsolete all of the equipment with which subscribers have been supplied.

It is a still further object of the present invention to provide an improved system (method and apparatus) for reducing audio noise due to sync suppression scrambling and descrambling of television signals which does not require separation of the audio from the video components of the signal before sync restoration in the descrambler.

It is a still further object of the present invention to provide an improved system (method and apparatus) for sync suppression scrambling and descrambling which allows the sound signals to be separated by intercarrier detection, and nevertheless is capable of reducing noise which may be added during descrambling by processing of the composite signal prior to intercarrier detection.

It is a still further object of the present invention to provide an improved system (method and apparatus) for sync suppression scrambling and descrambling of television signals which reduces noise added to the aural carrier by vertical sync restoring pulses or horizontal sync restoring pulses or both.

Briefly described, in the method of sync suppression scrambling of composite sync signals in accordance with the invention, the vertical sync component is processed for synchronizing signal suppression prior to transmission and the composite signal is processed after transmission for synchronizing signal restoration. The audio component of the composite signal is processed prior to transmission in a sense opposite to the processing thereof for synchronizing signal restoration after transmission. Accordingly, distortion of the aural component of the composite signal is compensated and audible noise components therein due to restoration are minimized.

The foregoing, and other objects, features and advantages of the invention, will become more apparent from a reading of the following description in connection with the accompanying drawings in which:

FIG. 2 is a diagram of the spectrum of the BTSC sound (Broadcast Television Sound) showing the spectrum of the noise components which appears when the invention is not used;

FIG. 3 is a series of waveforms at various points in the system of FIG. 1 which are explanatory of the operation thereof.

Figure 1:
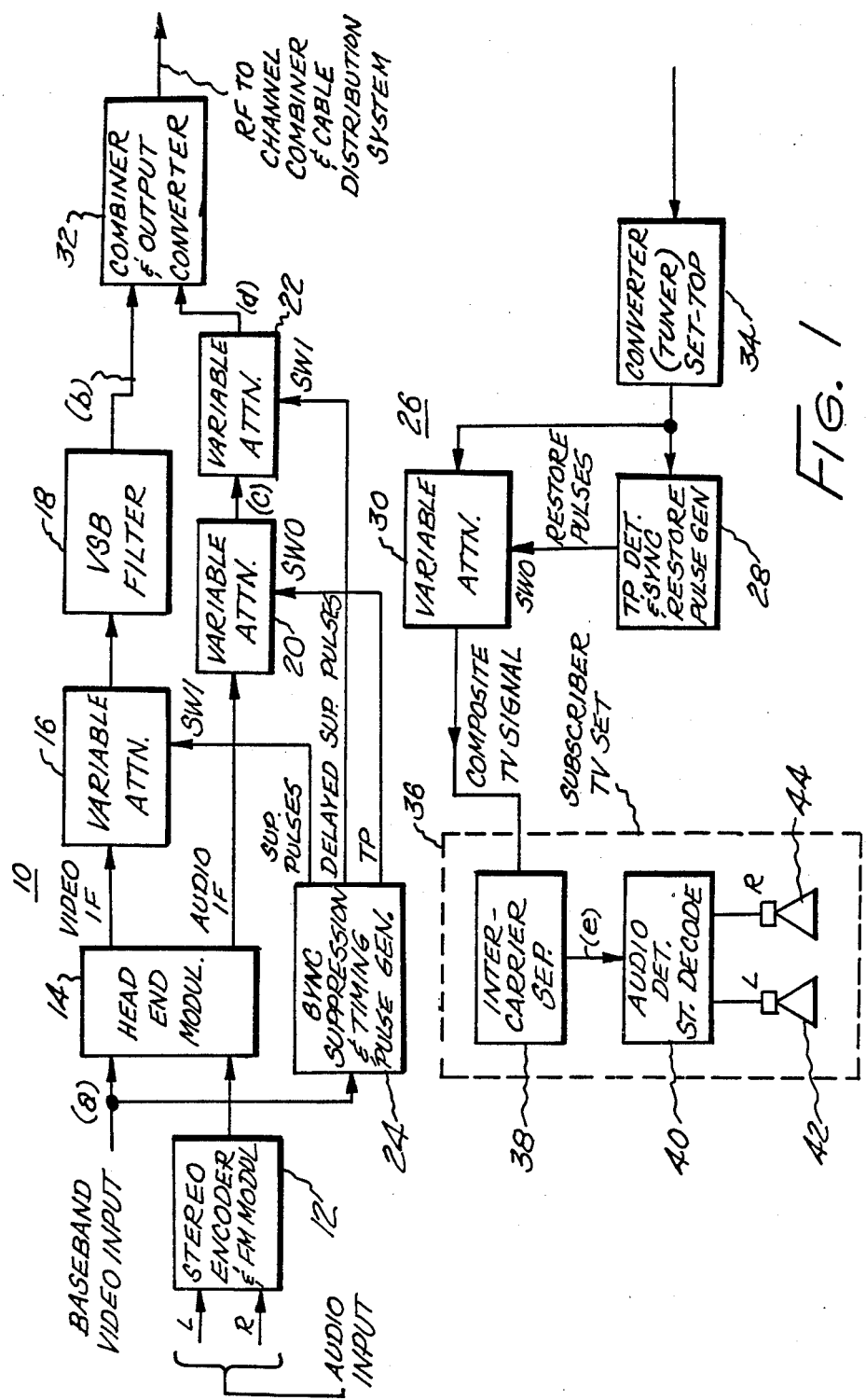
FIG. 1 is a block diagram of a cable television system using sync suppression scrambling and descrambling which incorporates the improvements for noise, particularly scrambling buzz reduction through processing of the audio carrier at the head end of the system in accordance with the invention.

Referring to FIGS. 1-3 of the drawings there is shown the head end modulator 10 of a CATV system. The inputs to this modulator are the baseband video signal which is shown in waveform (a) in FIG. 3. FIG. 3 shows two horizontal lines with their intervening horizontal sync intervals (H. INTV.) and the vertical interval (V. INTVL) which contains the vertical sync pulse. The audio input is a stereo input, with left and right signals, to a conventional stereo encoder which produces the composite BTSC format stereo. The spectrum of this audio signal as encoded by the stereo encoder 12 includes a baseband channel containing the sum (L+R) signals which extends approximately to 15 KHz. The difference (L−R) signals are on a carrier at approximately 30 KHz and is a double sideband suppressed carrier signal.

Without the use of the invention the vertical sync restoration pulses modulate the amplitude of the carrier at an approximately 60 Hz rate and produce a spectrum of components separated at the 60 Hz vertical sync rate. The amplitude of these components after conversion to FM by methods discussed above, is often sufficient to be heard. The vertical restoring pulses are therefore responsible for the annoying buzz like interference. There are also distortions resulting from the horizontal rate pulses which present their own spectrum of components separated by 60 Hz at the fundamental horizontal sync frequency $f_H$ (15.734 KHz) and at the harmonics of the horizontal sync rate. Due to the extended frequency response of the stereo signal, these additional noise components appear in the sound and may be audible. They can also adversely affect the stereo decoder, causing loss of stereo separation.

The invention substantially reduces the amplitude of the vertical sync restoring pulses and may, if desired, be implemented as described herein to substantially reduce the noise resulting from the horizontal sync restoration pulses. It will be appreciated that the principal source of the noise results from the pulse during the vertical interval. The distortion resulting from the horizontal rate pulses may also be reduced if desired and as accomplished in the herein illustrated embodiment of the invention.

The headend modulator and the scrambling and descrambling system are described generally herein since they are described in greater detail in the above-referenced Banker patent. The baseband video input is applied to the headend modulator 14 which includes the local oscillator and mixing circuits and outputs the video signal and the audio signal in separate video and audio intermediate frequency (IF) channels. The encoder 12 also may include an FM modulator, which may be a separate circuit so that the audio IF is frequency modulated. The video IF is applied to a variable attenuator 16, which may be a switched attenuator to apply a mutable reduction in the amplitude of a signal when the attenuator 16 is switched in. The reduction may be approximately 6 dB or 10 db. The video IF channel also includes a vestigial side band (VSB) filter 18.

The audio IF channel includes two variable attenuators, 20 and 22, which are switched out in the case of the variable attenuator 20 and switched in in the case of the variable attenuator 22. These attenuators 16 and 20 form part of the scrambling system together with a sync suppression and timing pulse generator 24. This generator 24 responds to the horizontal and vertical sync pulses and produces horizontal and vertical suppression pulses substantially coincident with the horizontal and vertical intervals.

The generator 24 also produces pulses similar to the suppression pulses, but delayed by an amount corresponding to the delay in the video IF channel interposed by the VSB filter 18. This is shown in waveform B as the "VSB delay". Because of this delay the video and audio components of the signal have a relative delay with respect to each other. In a practical system this delay may be approximately 5 microseconds. The delay is generated either using one shots or digital circuits.

In the timing pulse generator 24 the suppression pulses are applied to the variable attenuator 16 to switch in (SWI) the 6 dB of attenuation into the video IF, thereby reducing the amplitude and suppressing the horizontal and vertical sync pulses during all or a substantial part of the horizontal and vertical intervals. The delayed suppression pulses are applied to the attenuator 22 and switch in a reduction in amplitude of 6 dB corresponding to the reduction produced by the variable attenuator 16 in response to the suppression pulses. In order to control the timing of the descrambler 26 which is supplied to each authorized subscriber, a timing pulse is generated by the generator 24. This timing pulse is applied to the other variable attenuator 20 which is ahead of the delayed suppression pulse operated attenuator 22 in the audio IF channel.

As seen from waveform (b) the delayed video signal has the sync pulses in the horizontal and vertical intervals suppressed. The suppression causes confusion between the sync pulses and the video signals which prevents the synchronizing circuits of the subscriber's television receiver from locking in, thereby causing an unacceptably distorted image. The timing pulses are shown in waveform (c). They occur during each horizontal interval and with a known fixed or known variable delay as described in the above-referenced Banker patent. These timing pulses are detected in the timing pulse detector and sync restoring pulse generator 28 of the descrambler 26 and generate the restore pulses which are applied to a variable attenuator 30 and switch out the attenuation interposed by that attenuator and thereby providing an effective 6 dB increase in amplitude, restoring the horizontal and vertical sync pulses.

Waveform (d), shows the result of the variable attenuator 22 on the audio signal. The audio signal amplitude, like the video signal amplitude, is reduced by an amount corresponding to the attenuation (e.g., 6 dB or 10 db) and is coincident with the delayed video signal shown in waveform B which arrives from the VSB filter 18. The video and audio are applied to a combiner 5 and output converter 32 which raises the frequency to provide a channel of the CATV signal at RF to the cable.

Only one subscriber station location is shown in FIG. 1. The subscriber is equipped with a set top converter or tuner 34 to select the desired cable channel. The converter outputs the composite TV signal, including the video and aural carriers, to the descrambler 26. The descrambler operates at RF and outputs the composite TV signal with the synchronizing pulses restored to the subscriber's TV set 36. In that TV set there is the conventional intercarrier separator (detector) circuits 38 which remove the aural components and apply them to the audio detector 40 which may include a stereo decoder. The stereo decoder provides left and right output signals to speakers 42 and 44.

Waveform (e) shows the audio signal. Since the signal has been reduced in amplitude during the sync pulse intervals as shown in waveform (d), when the restoring pulses arrive, the reduction in amplitude is essentially compensated. The only distortion appearing on the audio are the very short timing pulses which are readily rejected by the FM decoders, and even if not rejected, contain very little energy so that the noise, if any resulting therefrom is practically imperceptible.

It will be observed that waveforms (b), (c), (d), and (e) are only one-half of the envelope of the carrier signal. The mirror image below the baseline of the signal is not shown to simplify the illustration.

Figure 4:
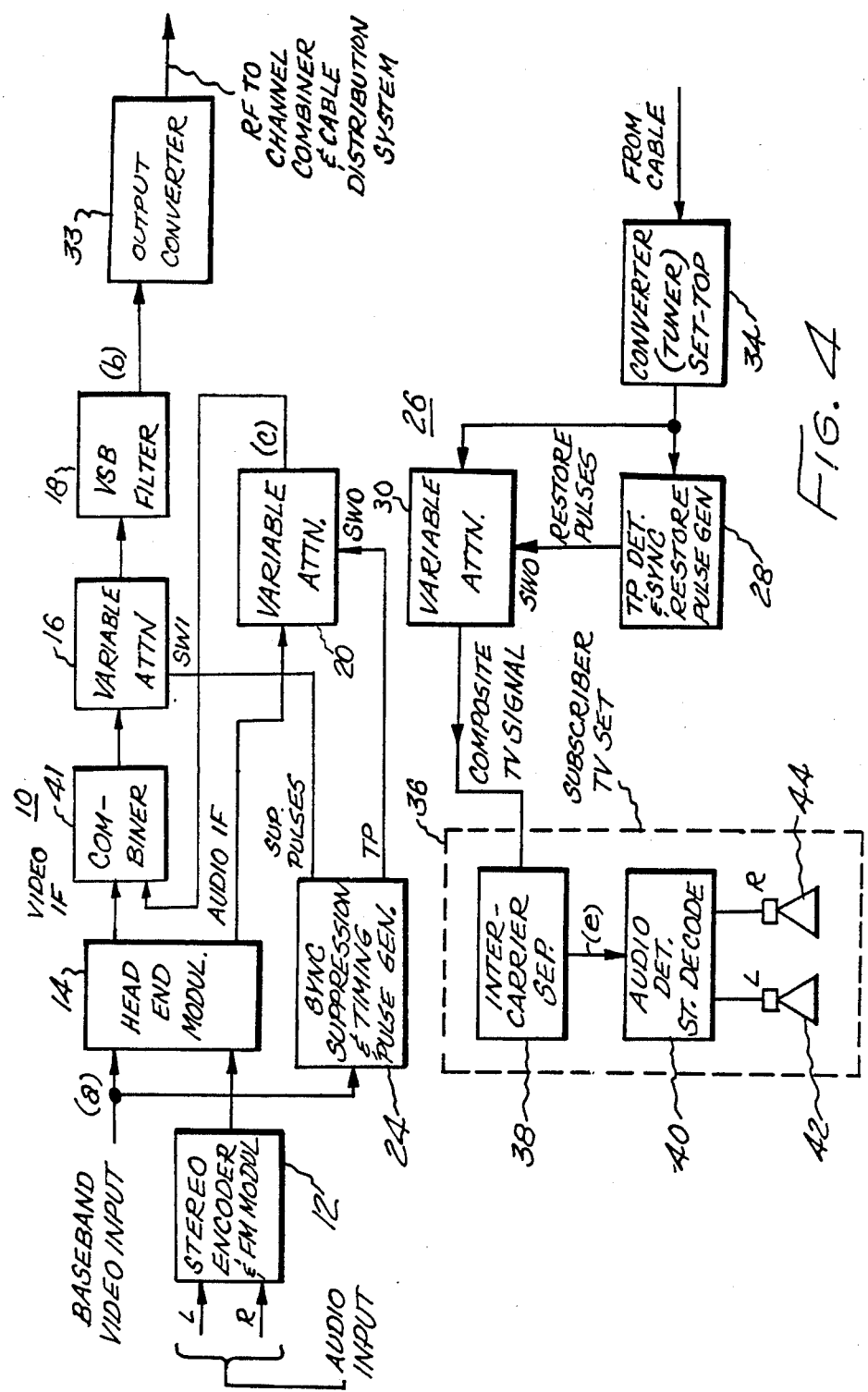
FIG. 4 is a block diagram similar to FIG. 1 showing another embodiment of the invention.

FIG. 4 is similar to FIG. 1, however after passing the audio IF through the variable attenuator 20, the audio IF, now with timing pulses, is combined in a combiner 41 with the video IF prior to sync suppression in the switched attenuator 16. In the attenuator 16, both the video and audio IF carriers are suppressed. When the variable attenuator 30 restores the amplitude of the video sync pulses, it also restores the amplitude of the audio carrier and hence buzz is reduced as heretofore described. The output converter 33 need not include a combiner.

In the FIG. 4 embodiment, there is no delay difference between suppression pulses on the video and audio carriers. This simplifies the sync suppression and timing pulse generator 24, and avoids the need for the delay that compensates for the VSB delay. This has the added benefit of simplifying the calibration of a scrambler to a modulator. Any phase shift introduced to the video carrier by the variable attenuator 16 is almost exactly also introduced to the audio carrier. Such phase shift cancels in the intercarrier detector 38 in the subscriber's television receiver, and avoids a possible cause of scrambling buzz. Also the FIG. 4 embodiment may use the switched attenuator circuitry already existing scramblers and modulators. The additional combiner 41 can be a simple two-way power divider used in reverse and can be added to existing scramblers with an external circuit.

It will be apparent from the foregoing discussion that the aural carrier amplitude is predistorted to compensate for the descrambling pulses. The interval of time when the descrambler effectively amplifies the aural carrier is known, since that is the time of occurrence of the restoring pulses from the generator 28. Then the attenuation of the aural carrier in the headend modulator by the attenuator 22 (since it is timed to be coincident and coincides) causes cancellation resulting in a reduction of the buzz producing amplitude modulation on the aural carrier and reduced interference to the audio. As noted above it may only be necessary to cancel some of the restoring pulses to achieve the desired reduction in interference. Preferably the vertical, high energy restoring pulses should be cancelled. Cancellation need not be complete to effect the desired results. There may be some errors due to timing between the scrambling and descrambling processes. However the coincidence of the reduced amplitude portions of the aural carrier and the restoring pulses will help since substantial amounts of energy will have been removed. The remaining energy can make little difference in the perceived noise. The same is true for the horizontal pulses which can cause loss of separation and false stereo triggering in extreme cases, even if the timing is imperfect and the amplitude compensation is not complete since most of the offending energy is still reduced substantially.

From the foregoing description it will be apparent that there has been provided an improved system (method and apparatus) for sync suppression scrambling and descrambling of television signals, particularly for subscriber television applications (CATV and the like). Variations and modifications in the herein described system within the scope of the invention will undoubtedly suggest themselves to those skilled in the art. Accordingly the foregoing description should be taken as illustrative and not in a limiting sense.

We claim:

1. In the method of sync suppression scrambling of composite TV signals having a video signal component with horizontal and vertical synchronizing signals in horizontal and vertical intervals thereof and an aural signal component and wherein the video signal component is processed for synchronizing signal suppression prior to transmission and the composite signal is processed after transmission for synchronizing signal restoration, the improvement which comprises the step of processing said audio component prior to transmission in a sense opposite to the processing thereof for synchronizing signal restoration after transmission whereby distortion of said aural component of said composite signal is compensated and audible noise components therein due to said restoration are minimized.

2. The improvement according to claim 1 wherein said video and aural components are combined prior to transmission and said processing step comprises the steps of decreasing the amplitude of said aural component in time coincidence with the suppression of said synchronizing signal and prior to being combined with said video component.

3. The improvement according to claim 2 wherein the amplitude of said aural component is decreased in time coincidence with said vertical synchronizing signal.

4. The improvement according to claim 2 wherein the amplitude of said aural component is decreased in coincidence with said vertical and with said horizontal synchronizing signals.

5. The improvement according to claim 2 wherein the amplitude of said synchronizing signals is decreased by generating suppression pulses coincident with said synchronizing signals and reducing the amplitude of said video signal component in response to said suppression pulses, and said processing step comprises the steps of generating a second pulse corresponding approximately in duration to said suppression pulse and in predetermined delayed time relationship therewith to correspond to the relative delay between said aural and video components prior to being combined, and reducing the amplitude of said aural component in response to said second pulse.

6. The improvement according to claim 1 wherein the amplitude of said synchronizing signals is decreased by generating suppression pulses coincident with said synchronizing signals and reducing the amplitude of said video signal component in response to said suppression pulses, and said processing step comprises the steps of combining said aural component with said video component, and reducing the amplitude of said aural component together with said video component in response to said suppression pulses.

7. The improvement according to claim 1 wherein the amplitude of said aural component is decreased in coincidence with said vertical and with said horizontal synchronizing signals.

8. In a sync suppression scrambling subscription TV system having a first channel with a scrambler in which the video component of a TV signal is processed to reduce the amplitude of the synchronizing signals thereof and having a second channel for the aural component of said TV signal and a combiner in which said video and aural components are combined into a composite TV signal for transmission, and having a descrambler through which said composite TV signal passes after transmission and in which it restored the amplitude of the synchronizing signals which have been reduced in amplitude, the improvement comprising means in said second channel for varying the amplitude of said aural component, and means for decreasing the amplitude of said aural component by an amount sufficient to compensate for the increase in amplitude of said aural component in said descrambler.

9. The improvement according to claim 8 wherein said aural component amplitude decreasing means comprises means in said first channel for combining said aural component with said video component prior to the reduction in amplitude of the synchronizing signals thereof.

10. The improvement in accordance with claim 8 wherein said video component has horizontal and vertical synchronizing signals and said scrambler is operative to decrease the amplitude of said horizontal and vertical synchronizing signals, said means for operating said amplitude varying means comprises means for operating said amplitude varying means approximately in time coincidence with the decrease in amplitude of said vertical synchronizing signal or in the amplitude of both said vertical and horizontal synchronizing signals.

11. The improvement according to claim 7 wherein said aural component amplitude varying means is in said second channel, said scrambler comprises means for generating first suppression pulses approximately coincident with said horizontal and vertical synchronizing pulses and means for reducing the amplitude of said video signal in response to said suppression pulses, and said means for operating said amplitude varying means comprises means for generating second suppression pulses in delayed time relationship with said first suppression pulses which are coincident with said vertical sync pulses or with both said vertical and horizontal sync pulses, said delayed time relationship being sufficient to correspond to the relative delay between said video and aural components in their respective channels, and means for applying said second suppression pulses to said amplitude varying means.

12. The improvement according to claim 11 wherein said scrambler comprises means for generating timing pulses and predetermined time relationship with said horizontal sync signals, means for modulating said aural component with said timing pulses to impose said pulses thereon, said modulating means preceding said amplitude varying means in said second channel, and said descrambler including means responsive to said timing pulses for restoring the amplitude of said synchronizing signals.

13. The improvement according to claim 9 wherein said scrambler comprises means for generating timing pulses and predetermined time relationship with said horizontal sync signals, means for modulating said aural component with said timing pulses to impose said pulses thereon, said modulating means preceding said amplitude varying means in said second channel, said combining means being a combiner in said first channel to which said aural component with said timing pulses thereon and said video component are applied prior to processing for reducing the amplitude of the synchronizing signals, and said descrambler including means responsive to said timing pulses for restoring the amplitude of said synchronizing signals and said aural component.

* * * * *